(No Model.)

S. J. EVANS & H. H. HUGGINS.
VARIABLE GEARING.

No. 598,863. Patented Feb. 8, 1898.

WITNESSES:

INVENTOR
S. J. Evans.
H. H. Huggins.

BY

ATTORNEYS.

UNITED STATES PATENT OFFICE.

SAMUEL J. EVANS AND HARRY H. HUGGINS, OF ROANOKE, VIRGINIA, ASSIGNORS, BY DIRECT AND MESNE ASSIGNMENTS, TO THE POPE MANUFACTURING COMPANY, OF PORTLAND, MAINE, AND HARTFORD, CONNECTICUT.

VARIABLE GEARING.

SPECIFICATION forming part of Letters Patent No. 598,863, dated February 8, 1898.

Application filed October 24, 1896. Serial No. 609,900. (No model.)

*To all whom it may concern:*

Be it known that we, SAMUEL J. EVANS and HARRY H. HUGGINS, of Roanoke, in the county of Roanoke and State of Virginia, have invented a new and Improved Variable Gearing, of which the following is a full, clear, and exact description.

The object of the invention is to provide a new and improved variable gearing which is simple and durable in construction, very effective in operation, designed for use on bicycles and other machines, and arranged to enable the rider or operator to vary the speed and power of the machine while the latter is in motion.

The invention consists of certain parts and details and combinations of the same, as will be fully described hereinafter, and then pointed out in the claims.

Reference is to be had to the accompanying drawings, forming a part of this specification, in which similar characters of reference indicate corresponding parts in all the figures.

Figure 1:
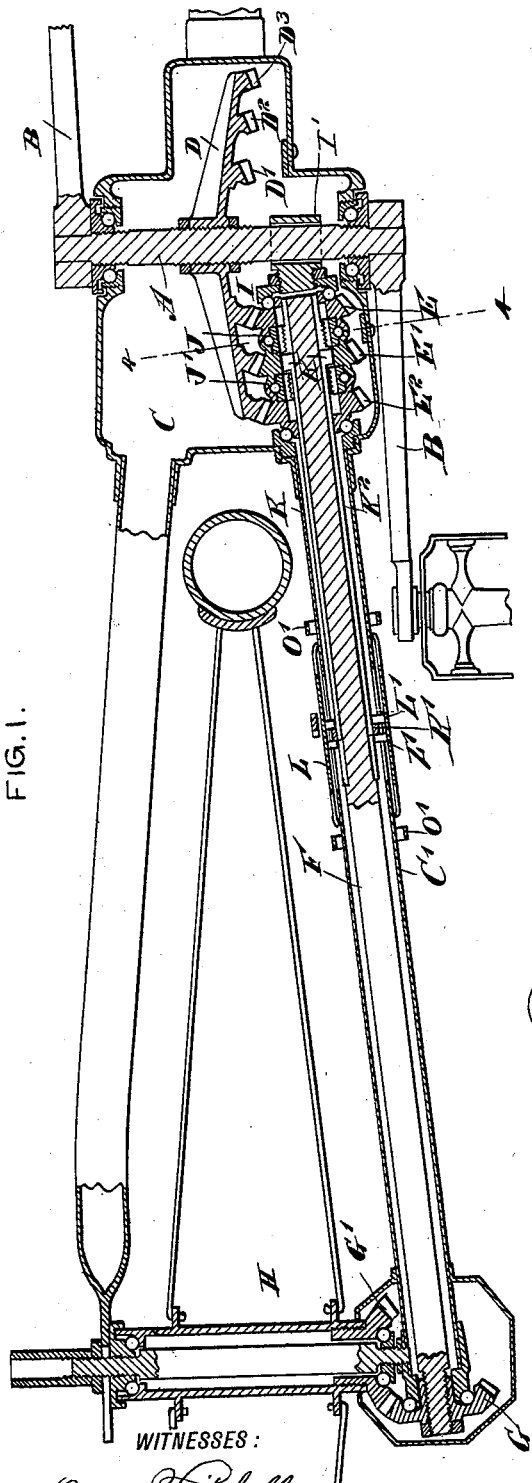
Figure 4:
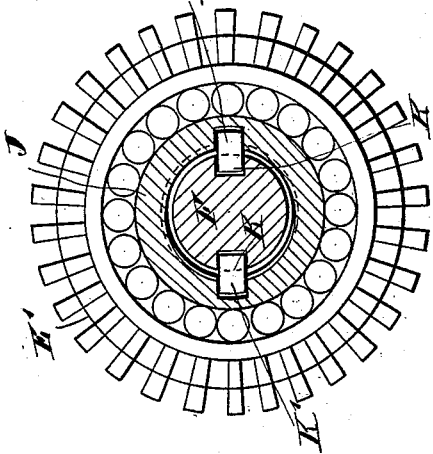
Figure 3:
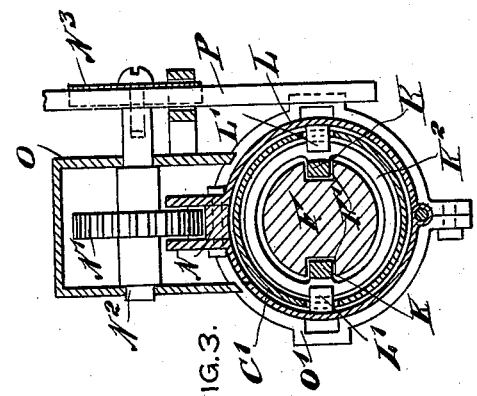
Figure 2:
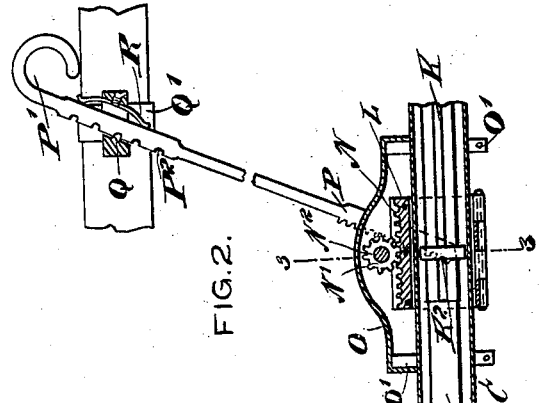

Figure 1 is a sectional plan view of the improvement. Fig. 2 is a sectional side elevation of the shifting device. Fig. 3 is an enlarged cross-section of the same on the line 3 3 of Fig. 2, and Fig. 4 is an enlarged cross-section of part of the improvement on the line 4 4 of Fig. 1.

The crank-shaft A is provided with the usual cranks B, carrying the pedals, and the said shaft is mounted to turn in suitable bearings in the crank-hanger C, forming part of the bicycle-frame. On the crank-shaft A within the crank-hanger C is detachably secured a disk D, on the face of which are formed or attached the concentrically-arranged circular gears $D'$ $D^2$ $D^3$ in mesh with pinions E $E'$ $E^2$, respectively mounted to rotate loosely on one end of a shaft F, extending through one of the lower braces $C'$, to carry at the outer end a beveled gear-wheel G in mesh with a beveled gear-wheel $G'$, secured to the hub of the rear or drive wheel H. The end of the shaft F next to the pinion E is mounted to turn in a bearing I, held on a stud $I'$, which latter is secured at each end to the crank-hanger C and through which the crank-shaft A passes loosely. The outer end of the shaft F has its bearing by the hub of the gear-wheel G being journaled in the end of the brace $C'$.

Between the pinions E and $E'$ is arranged a collar or separator J, detachably secured on the shaft F, and a similar collar or separator $J'$ is arranged between the gear-wheels $E'$ and $E^2$, the said separators forming bearings for the hubs of the pinions E $E'$ $E^2$. The said pinions, as well as the separators J and $J'$, are formed with longitudinally-extending keyways, either of which is adapted to be engaged by lugs $K'$, projecting outwardly from keys K, each fitted to slide longitudinally in a suitable groove $F'$, formed in the shaft F. As shown in the drawings, two such keys K are employed, and the outer ends of the same are attached to the outside of a ring $K^2$, fitted loosely over the shaft F, and engaged at opposite sides by pairs of lugs $L'$, projecting from the inside of a sleeve L, fitted to slide longitudinally on the brace $C'$, as is plainly shown in the drawings. The lugs $L'$ extend through longitudinal slots in the brace $C'$ to engage the ring $K^2$, as previously mentioned, so that when the sleeve L is shifted longitudinally a similar movement is given to the keys K, and consequently the lugs $K'$ are moved in engagement with keyways in either of the pinions E, $E'$, or $E^2$ and the separators J or $J'$. In order to impart this longitudinal movement to the sleeve L, we provide the same on top with a rack N in mesh with a pinion $N'$, secured on a transversely-extending shaft $N^2$, mounted to rotate in suitable bearings formed in a hood O, attached to clamps $O'$, engaging the brace $C'$. One outer end of the shaft $N^2$ carries a pinion $N^3$ in mesh with a rack P, extending upwardly and formed at its upper end with a handle $P'$ within convenient reach of the operator seated on the bicycle.

Near the upper end of the rack P are formed five notches $P^2$, adapted to engage a lug Q, formed on a clamp $Q'$, attached to the top brace of the bicycle-frame. A spring R, held on the said clamp $Q'$, holds the rack in engagement at one of its notches $P^2$ with the lug Q'. The notches P² are so arranged relatively to the lugs K' that upon moving the rack P up and down it engages one of the notches with the lug Q and the lugs K' engage a corresponding keyway in any of the pinions E E' E² and the separators J J'—that is, when the top notch P² engages the lug Q then the lug K' is in engagement with the pinion E², and when the rack P is pulled upward to engage the second notch P² with the lug Q then the lug K' is in the keyway of the separator J'. The third notch corresponds with the pinion E', the fourth one corresponds with the separator J, and the lowermost one with the pinion E.

The operation is as follows: When the several parts are in the position illustrated in the drawings, then the pinion E' is locked by the lugs K' to the shaft F, while the pinions E and E² are free to rotate loosely on the shaft. When a rotary motion is given to the crank-shaft A, then the disk D by the gear-wheels D' D² D³ will rotate the several pinions E E' E²; but as the pinion E' is the only one locked to the shaft F it is evident that the latter is rotated at a speed corresponding to the speed of the shaft A and the relative sizes of the gear-wheel D² and the pinion E'. The rotary motion of the shaft F is transmitted by the beveled gear-wheels G G' to the drive-wheel H at a corresponding rate of speed. When it is desired to increase the speed of the drive-wheel H, the operator pushes the rack P downward two notches to rotate the pinion N³, the shaft N², and the gear-wheel N' and impart a sliding motion to the left to the rack N and sleeve L, so that the keys K are shifted to the left to bring the lugs K' in mesh with the keyways in the pinion E², the said lugs passing loosely through the keyways in the separator J'. The pinion E' is now free to revolve loosely on the shaft, together with the pinion E, while the pinion E² drives the shaft F, and the speed of the latter is increased owing to the gear-wheel D³ being larger than the gear-wheel D², which formerly was the driving-wheel. When it is desired to decrease the speed of the wheel H, the keys K are shifted to the right by pulling the rack P up to the bottom notch P², so that the lugs K' engage the keyways in the pinion E, and the latter and the gear-wheel D' become the driving-wheels. When it is desired to hold the crank-arms B stationary for coasting or other purposes and without the rider lifting his feet off the pedals, then the rider moves the rack P either into the second uppermost or second lowermost notch P², so that the lugs K' of the keys K engage the keyways of either separator J or J'. It is evident that the shaft F can now rotate, it being driven from the drive-wheel H, without carrying along any of the pinions E E' E², as the same are not locked to the shaft, and consequently the shaft remains stationary.

Having thus fully described our invention, we claim as new and desire to secure by Letters Patent—

1. In a variable gearing for bicycles, the combination with a pedal-shaft, and a plurality of concentric gears on said shaft, of a longitudinally-grooved shaft at approximately right angles to the pedal-shaft and having its rear end geared with the drive-wheel, a plurality of pinions loosely mounted on the forward end of the said shaft and meshing with the gears of the pedal-shaft, separators arranged between the pinions and forming bearings for the same, said pinions and separators being provided with keyways, and a key sliding in the groove of the shaft and adapted to be moved into engagement with the ways of the pinions or separators, substantially as described.

2. In a variable gearing, the combination of a frame having a hollow crank-hanger and hollow braces, a pedal-shaft mounted in the hanger, a disk mounted on the pedal-shaft in the hollow crank-hanger and having concentric gears, a longitudinally-grooved shaft in one of the tubular braces with its forward end projecting into the hollow crank-hanger and having its rear end geared with the drive-wheel, a plurality of pinions loosely mounted on the forward end of said shaft within the crank-hanger and meshing with the concentric gears, separators on the shaft between the pinions and forming bearings for the same, said separators and pinions being provided with keyways, keys sliding in the grooves of the shaft and adapted to engage either the ways of the pinions or separators, and a sliding sleeve on the tubular brace for operating the keys, substantially as described.

3. In a variable gearing, the combination of a frame having a hollow crank-hanger and hollow braces, a pedal-shaft mounted in the hanger, a disk on the pedal-shaft in the crank-hanger and having concentric gears, a longitudinally-grooved shaft in one of the braces and having its rear end geared to the drive-wheel, a plurality of pinions loosely mounted on the forward end of the said shaft and meshing with the concentric gears, said pinions being spaced apart and provided with keyways, keys sliding in the grooves of the shaft, a ring on the shaft and connecting the keys, a sliding sleeve on the brace of the frame in which the shaft is mounted and connected with the said ring, and means for operating the sleeve, substantially as described.

4. A variable gearing provided with a series of pinions, and separators adjustably secured to the shaft on which the pinions are mounted and forming bearings for the said pinions and separating them the desired distance apart, substantially as shown and described.

5. In a variable gear for bicycles, the combination with the frame, and the crank-shaft provided with a plurality of concentric gear-wheels, of a longitudinally-grooved shaft in one of the braces and having its rear end geared with the rear or drive wheel, pinions loosely mounted on the forward end of the said shaft and meshing with the said gear-wheels, a key sliding in the grooves of the shaft and adapted to engage any one of the pinions, a ring on the outer end of the keys and fitting loosely on the shaft, a sleeve fitting on the brace in which the shaft is located and provided with a rack and lugs engaging the said ring, a shaft above the sleeve and provided with two pinions, one of which meshes with the rack, a handle-rack engaging the other pinion of the shaft, and means for locking the handle-rack, substantially as described.

SAMUEL J. EVANS.
HARRY H. HUGGINS.

Witnesses:
THOS. W. MILLER,
THOMAS ENGLEBY.